United States Patent
Elron et al.

(10) Patent No.: US 8,892,512 B2
(45) Date of Patent: *Nov. 18, 2014

(54) SYNCHRONIZATION FOR INITIALIZATION OF A REMOTE MIRROR STORAGE FACILITY

(75) Inventors: Rami Elron, Haifa (IL); Ehood Garmiza, Neve Ziv (IL); Haim Helman, San Jose, CA (US); Assaf Nitzan, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 163 days.

This patent is subject to a terminal disclaimer.

(21) Appl. No.: 13/486,528

(22) Filed: Jun. 1, 2012

(65) Prior Publication Data

US 2012/0239622 A1      Sep. 20, 2012

Related U.S. Application Data

(63) Continuation of application No. 12/903,520, filed on Oct. 13, 2010.

(51) Int. Cl.
*G06F 7/00*        (2006.01)
*G06F 17/30*       (2006.01)

(52) U.S. Cl.
CPC ............................... *G06F 17/30575* (2013.01)
USPC ............ 707/610; 707/639; 711/162; 711/165

(58) Field of Classification Search
USPC ........................... 707/610, 639; 711/162, 165
See application file for complete search history.

(56) References Cited

U.S. PATENT DOCUMENTS

| | | | |
|---|---|---|---|
| 6,081,875 A | 6/2000 | Clifton et al. | |
| 6,529,944 B1 | 3/2003 | LeCrone | |
| 6,594,744 B1 | 7/2003 | Humlicek et al. | |
| 6,665,780 B1 | 12/2003 | Bradley | |
| 6,697,881 B2 | 2/2004 | Cochran | |
| 7,240,238 B2 | 7/2007 | Yanai et al. | |
| 7,334,095 B1 | 2/2008 | Fair et al. | |
| 7,409,512 B1 | 8/2008 | Kekre et al. | |
| 7,831,550 B1 * | 11/2010 | Pande et al. | 707/610 |
| 8,108,634 B1 * | 1/2012 | Natanzon et al. | 707/610 |
| 2005/0071388 A1 * | 3/2005 | Fienblit et al. | 707/204 |
| 2006/0161808 A1 | 7/2006 | Burkey | |
| 2007/0022264 A1 * | 1/2007 | Bromling et al. | 711/162 |
| 2007/0083722 A1 * | 4/2007 | Per et al. | 711/162 |
| 2009/0006794 A1 * | 1/2009 | Mizuta et al. | 711/162 |
| 2010/0161900 A1 * | 6/2010 | Satoyama et al. | 711/114 |

OTHER PUBLICATIONS

IBM Corporation, "Starting the incremental resynchronization function with initialization", 2004. URL:http://publib.boulder.ibm.com/infocenter/dsichelp/ds8000ic/index.jsp?topic=/com.ibm.storage.ssic.help.doc/f2c_howincremental_31p2gh.html.

* cited by examiner

*Primary Examiner* — Hosain Alam
*Assistant Examiner* — Jieying Tang
(74) *Attorney, Agent, or Firm* — Griffiths & Seaton PLLC

(57) ABSTRACT

A method includes computing, in a local storage system having a local volume with a plurality of local regions, respective local signatures over the local regions, and computing, in a remote storage system having a remote volume with remote regions in a one-to-one correspondence with the local regions, respective remote signatures over the remote regions. A given remote region is identified, the given remote region having a given remote signature and a corresponding local region with a given local signature that does not match the given remote signature. The data in the given remote region is then replaced with data from the corresponding local region.

6 Claims, 4 Drawing Sheets

SYNCHRONIZATION FOR INITIALIZATION OF A REMOTE MIRROR STORAGE FACILITY

CROSS-REFERENCE TO RELATED APPLICATIONS

This Application is a Continuation of U.S. patent application Ser. No. 12/903,520, filed on Oct. 13, 2010.

FIELD OF THE INVENTION

The present invention relates generally to data storage, and specifically to the initialization and synchronization of a remote volume for asynchronous or synchronous mirroring.

BACKGROUND OF THE INVENTION

Snapshots and mirroring are among the techniques employed by data storage facilities for disaster recovery planning A snapshot may be a copy of data residing on a storage volume (e.g., a disk drive) that is created at a particular point in time. Since a full backup of a large data set can take a long time to complete, a snapshot may define the dataset to be backed up. Data associated with the snapshot is static, and is therefore protected from any subsequent changes to the data on the volume (e.g., a database update).

One typical implementation of a snapshot is called a "pointer snapshot." A pointer snapshot records an index of data locations to be protected on the volume. Pointer snapshots can be created fairly quickly and require far less storage space than is required to maintain a separate copy of the snapshot data.

SUMMARY OF THE INVENTION

An embodiment of the present invention provides a method, including computing, in a local storage system having a local volume with a plurality of local regions, respective local signatures over the local regions, computing, in a remote storage system having a remote volume with remote regions in a one-to-one correspondence with the local regions, respective remote signatures over the remote regions, identifying for a given remote region having a given remote signature and a corresponding local region having a given local signature that the given remote signature does not match the given local signature, and replacing data in the given remote region with data from the corresponding local region.

There is also provided, in accordance with an embodiment of the present invention, an apparatus, including a local storage system having a local volume with a plurality of local regions, and a first processor configured to compute respective local signatures over the local regions, and a remote storage system having a remote volume with remote regions in a one-to-one correspondence with the local regions, and a second processor configured to compute respective remote signatures over the remote regions, to identify for a given remote region having a given remote signature and a corresponding local region having a given local signature that the given remote signature does not match the given local signature, and to replace data in the given remote region with data from the corresponding local region.

There is further provided, in accordance with an embodiment of the present invention, a computer program product including a non-transitory computer readable storage medium having computer readable program code embodied therewith, the computer readable program code including computer readable program code configured to compute, in a local storage system having a local volume with a plurality of local regions, respective local signatures over the local regions, computer readable program code configured to compute, in a remote storage system having a remote volume with remote regions in a one-to-one correspondence with the local regions, respective remote signatures over the remote regions, computer readable program code configured to identify for a given remote region having a given remote signature and a corresponding local region having a given local signature that the given remote signature does not match the given local signature, and computer readable program code configured to replace data in the given remote region with data from the corresponding local region.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Figure 1:
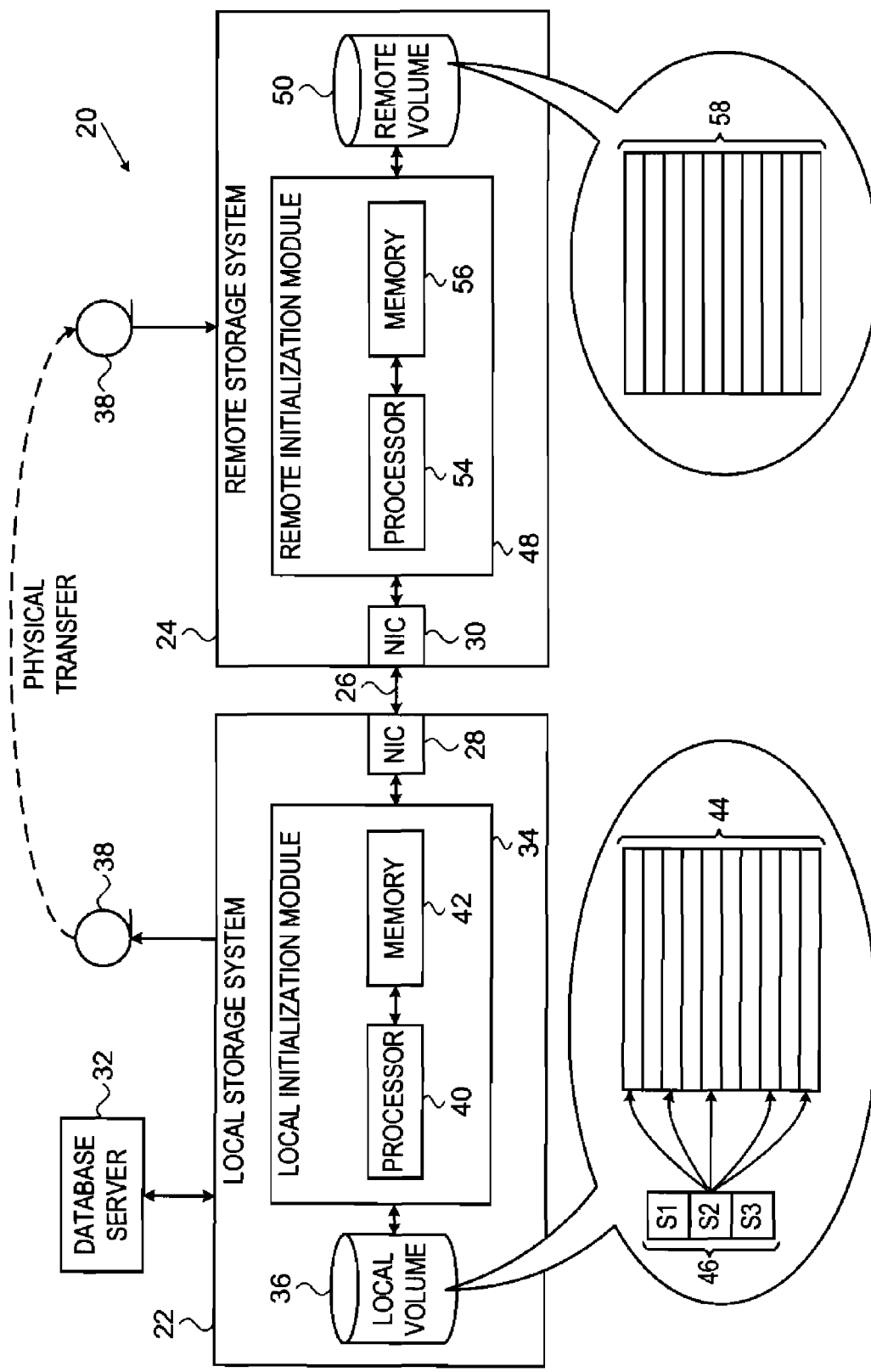
FIG. 1 is a schematic pictorial illustration of a remote mirror initialization and synchronization facility, in accordance with an embodiment of the present invention.

Mirroring replicates a local storage volume to a separate remote storage volume, in order to ensure redundancy. For a storage facility comprising the local and remote storage volumes, mirroring can be implemented either synchronously or asynchronously. During synchronous mirroring, a host (e.g., a database server) communicating with the storage facility receives a write acknowledgement after data is successfully written to both the local and the remote storage volumes. Synchronous mirroring is typically implemented over a high speed local area network (LAN) or a wide area network (WAN).

During asynchronous mirroring, the host receives the write acknowledgement after the data is written to the local volume (i.e., the remote volume may have not yet received the data and/or may not have acknowledged writing the data). Asynchronous mirroring is typically implemented over lower speed wide area networks, especially over greater distances.

When initializing local and remote storage volumes of a data storage facility, data in the local and remote volumes must be first be synchronized (i.e., the data must be consistent), prior to beginning remote mirroring. Embodiments of the present invention provide methods and systems for synchronizing the local and remote storage volumes, accommodating any differences in data stored on the two volumes. In the following description, the local and the remote volumes are assumed to function respectively in local and remote systems of the storage facility.

Prior to the synchronization, a reference snapshot of the local volume is created, and the reference snapshot data is stored to a removable medium (e.g., magnetic tape). The removable medium is then physically transferred to the remote volume site, and loaded to the remote volume. The reference snapshot is a snapshot of the local volume that can be used as baseline during the synchronization.

In a first embodiment, the local storage system then calculates local signatures (e.g., checksums) over local regions (a region is a sequence of bytes having a specific length, typically one megabyte) on a current snapshot of the local volume. The current snapshot may be either the reference snapshot or a more recent snapshot of the local volume. The local system conveys the local signatures to the remote storage system via a data communication channel. Upon receiving the local signatures, the remote storage system calculates corresponding remote signatures over remote regions of the remote volume. If the remote storage system identifies a remote signature not matching its corresponding local signature, the remote system informs the local system. The local system conveys the data of the local region, the current data, to the remote system, which then replaces the non-current data in the remote region with the current data.

In a second embodiment, the local storage system creates a local bitmap indicating realized (i.e., written to) and non-realized regions of the current snapshot. The local storage system then conveys the local bitmap to the remote storage system. In addition, the remote storage system creates a remote bitmap indicating realized and non-realized regions of the remote volume, and compares the two bitmaps. If a region is realized solely in the local bitmap, then data in the region associated with the realized local region is conveyed from the local system for copying to the corresponding remote region. If a region is realized solely in the remote bitmap, then the realized remote region is reclaimed by the remote storage system. Reclaiming the remote region releases the remote region for re-use by the remote volume.

In the event a region is realized in both the local and remote bitmaps, then the local storage system calculates a local signature for the region associated with the local bitmap entry, and the remote storage system calculates a remote signature for the corresponding region associated with the remote bitmap entry. If the signatures match, no further action is taken. If, for a given region, the local and remote signatures do not match, i.e., the remote system has non-current data, then the local system conveys the current data to the remote storage system for replacement of the non-current data of the given region.

Embodiments of the present invention provide an efficient method of synchronizing local and remote volumes during initialization. In the first embodiment, the local signatures and any local regions differing from their corresponding remote regions are conveyed from the local volume to the remote volume. The second embodiment reduces the amount of conveyed data, by conveying only the local bitmap, the local signatures for regions realized in both local and remote bitmaps, and data that needs to be replaced on the remote volume. Once synchronization is complete, remote mirroring of the local volume on the remote volume may proceed.

System Description

FIG. 1 is a schematic pictorial illustration of a remote mirror initialization and synchronization facility 20, in accordance with a disclosed embodiment of the present invention. Facility 20 comprises a local storage system 22 having volumes which are to be mirrored to volumes of a remote storage system 24. The mirroring, as well as other communication between the systems, is performed over a low bandwidth transmission channel 26, such as is comprised in a wide area network (WAN), via network interface cards (NICs) 28 and 30 in the two storage systems. In the configuration shown in FIG. 1, storage system 22 stores data for a database server 32 (or any other host computer) that is typically connected to the storage system via a high speed connection, such as Ethernet.

Local storage system 22 comprises a local initialization module 34, a local volume 36 (e.g., a disk drive) and NIC 28. Local initialization module 34 comprises a processor 40 and a memory 42. Local volume 36 stores data in a plurality of local regions 44 which the local storage system can reference via local snapshots 46.

Remote storage system 24 comprises a remote initialization module 48, a remote volume 50 and NIC 30. Remote initialization module 48 comprises a processor 54 and a memory 56. Remote volume 36 stores data in remote regions 58. Remote volume 50 is typically dedicated for the mirroring of local volume 36, and remote regions 58 have a one-to-one correspondence with local regions 44.

Local storage system 22 is operative to store data to a removable medium 38 which can be physically transported from the site of the local storage system to the site of the remote storage system. Remote storage system 24 is operative to load data from removable medium 38.

Processors 40 and 54 typically comprise general-purpose computers, which are programmed in software to carry out the functions described herein. The software may be downloaded to local initialization module 34 and remote initialization module 48 in electronic form, over a network, for example, or it may be provided on non-transitory tangible media, such as optical, magnetic or electronic memory media. Alternatively, some or all of the functions of processors 40 and 54 may be carried out by dedicated or programmable digital hardware components, or using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Remote Region Synchronization

Figure 2:
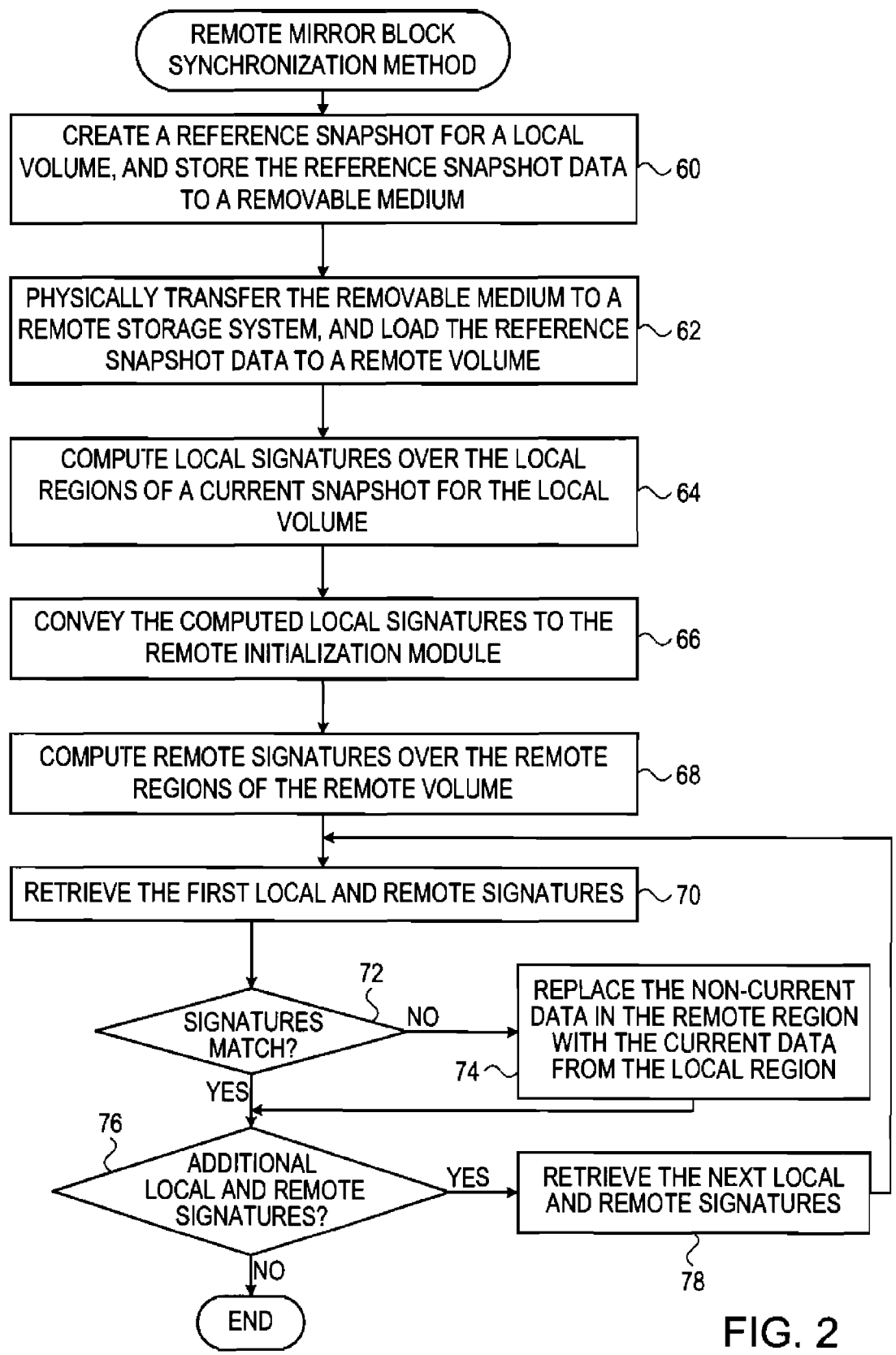
FIG. 2 is a flow diagram that schematically illustrates a local and remote region synchronization method, in accordance with a first embodiment of the present invention.

FIG. 2 is a flow diagram that schematically illustrates a method of local and remote region synchronization, in accordance with a first embodiment of the present invention. In an initial step 60, processor 40 creates a reference snapshot (i.e., one of local snapshots 46) of local volume 36, and stores the reference snapshot to removable medium 38. The reference snapshot is a record of the local volume that facility 20 uses as a baseline during the synchronization. In a data transfer step 62, the removable medium is physically transferred to the site of remote storage system 24, where processor 54 loads the reference snapshot data from the removable medium to remote volume 50. The physical transfer of the removable medium may be by any convenient method for physical transportation of the media, such as by hand and/or by a vehicle.

After verifying that the reference snapshot was loaded correctly, processor 54 locks the remote volume into a read-only mode, to prevent any updates to the remote volume prior to synchronization of the local and the remote volumes. Processor 54 then transmits a notification of correct snapshot storage to local initialization module 34 via channel 26. The notification confirms that the remote regions stored on the remote volume respectively correspond with the local regions on the local volume at the time of the reference snapshot. In other words, the two volumes have a one-to-one correspondence of regions, and the data in each pair of corresponding regions is identical.

In a first signature computation step 64, upon receiving the notification, processor 40 creates a current snapshot of the local volume, computes respective local signatures over local regions 44 of the current snapshot, and stores the local signatures to memory 42. Each of the local signatures is associated to a given one of local regions 44.

Creating a current snapshot enables facility 20 to detect any updates to local volume 36 subsequent to processor 40 creating the reference snapshot. If there are no updates to local volume 36 subsequent to creating the reference snapshot, then the reference and current snapshots are equivalent. If, however, there are any updates to local volume 36 subsequent to creating the reference snapshot, then the current and reference snapshots are different.

A signature typically comprises a checksum calculation performed on data in a region. One example checksum calculation is the Message-Digest algorithm 5 (MD5), which is a cryptographic hash function with a 128-bit hash value. Checksum calculations, such as MD5 are not collision resistant (i.e., for two regions a and b, there may be instances where a hash function H yields H(a)=H(b)). For example, a 64 terabyte (TB) storage volume with 64 kilobyte (KB) regions has $10^9$ regions in the volume. Since the MD5 has a 128 bit hash value, the probability of a false negative is $2^{128}$. Therefore the chance of a collision in the 64 TB storage volume is $(2^{28}/2^{128})$ or 1 in $2^{100}$.

Returning to the flow diagram, in a transfer signature step 66, processor 40 conveys the local signatures from memory 42 to remote initialization module 48 via channel 26. Upon receiving the local signatures, processor 54 stores the local signatures to memory 56. In a second signature calculation step 68, processor 54 computes respective remote signatures over remote regions 58 on remote volume 50, and stores the remote signatures to memory 56. Each of the remote signatures is associated with a given one of remote regions 58, and corresponds to one of the local signatures.

In a first retrieval step 70, processor 54 retrieves the first corresponding local and remote signatures from memory 56. Remote processor 54 then compares the retrieved corresponding local and remote signatures in a signature comparison step 72. If the compared signatures do not match, then in a region update step 74, processor 54 transmits a data transfer request to local initialization module 34 over channel 26. Non-matching signatures typically occur if there is a difference between the current snapshot and the reference snapshot. The request includes a parameter indicating the given local region for the retrieved local signature. Upon receiving the request, processor 40 transmits the requested local region to remote initialization module 48 over channel 26. On receipt of the requested local region, processor 54 replaces the non-current data in the given remote region for the compared remote signature with the current data from the received local region.

If, in step 72, the compared signatures match, then in a comparison step 76, processor 54 checks if there are any additional local and remote signatures in memory 56 that have not yet been compared. If there are additional local and remote signatures, then processor 54, in a second retrieval step 78, retrieves the next local and remote signatures from memory 56, and the method continues with step 72.

The process of the flow diagram stops when signatures on remote regions 58 match local regions 44 corresponding to the current snapshot.

Figure 3:
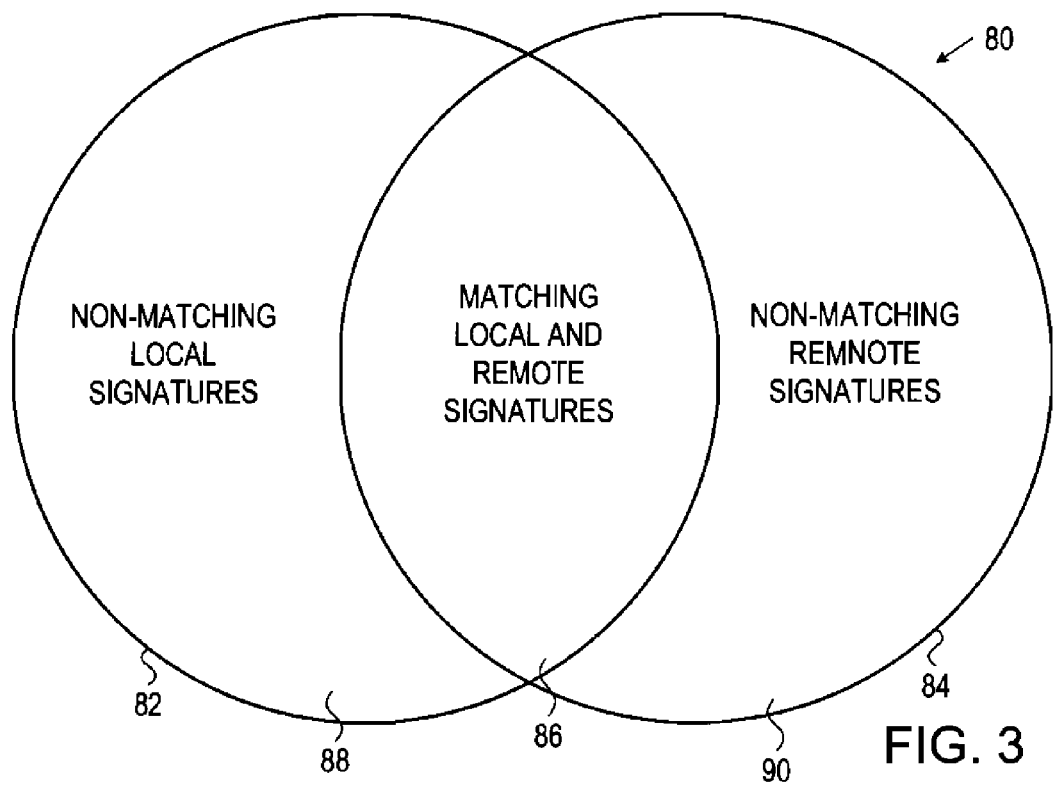
FIG. 3 is a first Venn diagram that schematically illustrates regions on local and remote storage volumes of the remote mirror initialization and synchronization facility, in accordance with the first embodiment of the present invention.

FIG. 3 is a first Venn diagram 80 that schematically illustrates a local set 82 comprising local regions 44 specified by the current snapshot, and a remote set 84 comprising remote regions 58 specified by the reference snapshot. Sets 82 and 84 represent the regions stored on local volume 36 and remote volume 50, respectively, prior to synchronization.

A subset 86 comprises an intersection of local set 82 and remote set 84, wherein the local and remote region signatures match. A subset 88 comprises local regions 44 in local set 82 whose local signatures do not match their corresponding remote signatures. Typically, these regions are of data that has not yet been copied to remote volume 50. A subset 90 comprises remote regions 58 in remote set 84 whose remote signatures do not match their corresponding local signatures. Regions of subset 90 may, for example, exist because these regions hold data that is no longer present in local volume 36.

Figure 4:
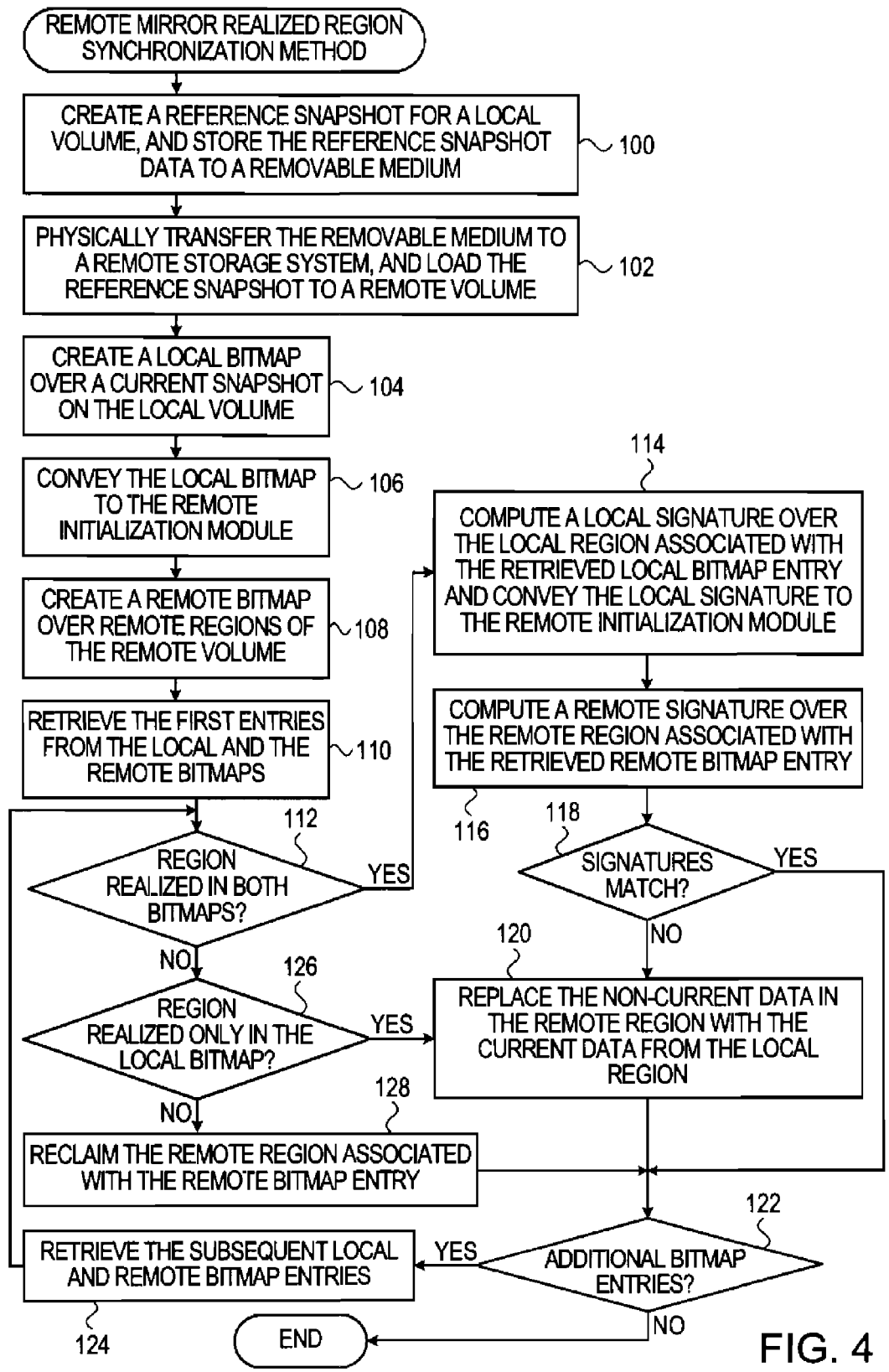
FIG. 4 is a flow diagram that schematically illustrates an local and remote realized region synchronization method, in accordance with a second embodiment of the present invention.

FIG. 4 is a flow diagram that schematically illustrates a local and remote realized region synchronization method, in accordance with a second embodiment of the present invention. An initial step 100 and a data transfer step 102 are respectively substantially as described for initial step 60 and data transfer step 62, respectively (FIG. 2). Thus, at the conclusion of step 100, the data stored on the remote volume corresponds with the data on the local volume at the time of the reference snapshot.

In a first bitmap creation step 104, processor 40 first creates a current snapshot of the local volume, creates a local bitmap over realized and non-realized local regions 44 of the current snapshot, and stores the local bitmap to memory 42. Each bit in the local bitmap is associated with one of local regions 44 and indicates a local realization status i.e., whether or not an associated local region has been written to. In a bitmap transfer step 106, processor 40 conveys the local bitmap from memory 42 to remote initialization module 48 via channel 26, and processor 54 loads the local bitmap to memory 56.

In a second bitmap creation step 108, processor 54 creates a remote bitmap over realized and non-realized remote regions 58 in remote volume 50, and stores the remote bitmap to memory 56. Each bit in the remote bitmap is associated with one of remote regions 58 and indicates a remote realization status for the associated remote region. In both the local and remote bitmaps, a "1" can indicate a realized region and a "0" can indicate a non-realized region on the appropriate volume.

In a retrieval step 110, processor 54 retrieves the first entries of the local and the remote bitmaps from memory 56. In a first bitmap entry comparison step 112, if the local and the remote realization statuses for the respective retrieved bitmap entries indicate that the associated local and remote regions are both realized, then processor 54 transmits a signature transfer request to local initialization module 34 via channel 26. The request includes a parameter indicating the local region associated with the retrieved local bitmap entry. Upon receiving the request, processor 40, in a first signature computation step 114, loads the local region indicated by the parameter to memory 42, computes a local signature over the loaded local region (i.e., the local region associated with the retrieved local bitmap entry), and conveys the local signature to remote initialization module 48 via channel 26.

Upon receiving the local signature, processor 54, in a second signature computation step 116, loads the remote region (from the remote volume) associated to the retrieved remote bitmap entry, and computes a remote signature for the loaded remote region (i.e., the remote region associated with the retrieved remote bitmap entry).

In a signature comparison step 118, if the local and the remote signatures do not match, then processor 54, in a region update step 120, transmits a data transfer request to local initialization module 34. The request includes a parameter indicating the local region associated with the computed local signature. Upon receiving the request, processor 40 transmits the local region from memory 42 (the region is still in the memory from step 114) to remote initialization module 48 via channel 26. Upon receiving the local region, processor 54 replaces the non-current data in the remote region (associated with the compared remote bitmap entry) with the current data of the received local region.

In a comparison step 122, if there are any remaining local and remote bitmap entries in memory 56 that have not yet been compared, then processor 54, in a continuation step 124, retrieves the next local and remote bitmap entries from memory 56, and the method continues with step 112.

Returning to step 118, if the compared local and remote signatures match, then the method continues with step 122.

Returning to step 112, if the local and the remote realization statuses for the respective retrieved bitmap entries indicate that the regions associated to the retrieved remote and local bitmap entries are not both realized, then processor 54, in a second bitmap entry comparison step 126, checks if only the local region associated with the retrieved local bitmap entry is realized. If the comparison returns true, then the method continues with step 120. If the comparison returns false, then only the region associated with the retrieved remote bitmap entry is realized, and processor 54 reclaims the remote region associated with the retrieved remote bitmap entry in a reclaim step 128, and the method continues with step 122.

The process of the flow diagram stops when signatures on remote regions 58 match local regions 44 corresponding to the current snapshot.

Figure 5:
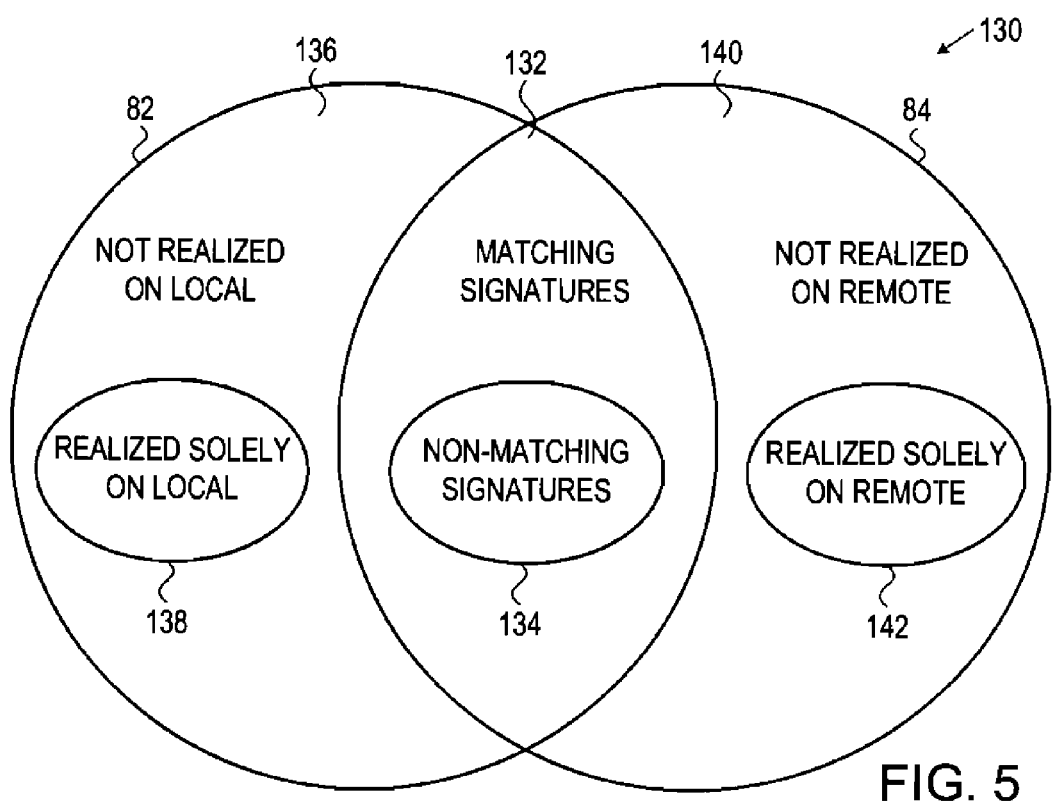
FIG. 5 is a second Venn diagram that schematically illustrates regions on local and remote storage volumes of the remote mirror initialization and synchronization facility, in accordance with the second embodiment of the present invention.

FIG. 5 is a second Venn diagram 130 that schematically illustrates local set 82 comprising local regions 44 specified by the current snapshot, and remote set 84 comprising remote regions 58. As in Venn diagram 80 discussed supra, local set 82 comprises local regions 44 specified by the current snapshot, and remote set 84 comprises remote regions 58 specified by the reference snapshot. Sets 82 and 84 represent the regions stored on local volume 36 and remote volume 50, respectively, prior to synchronization.

An intersection of local set 82 and remote set 84 comprises regions realized in both the local and the remote sets. The intersection comprises two subsets, a matching signature subset 132 comprising the corresponding realized regions in the local and the remote sets with matching signatures, and a non-matching signature subset 134 comprising the corresponding regions in the local and the remote sets whose signatures do not match. Within local set 82, a non-realized local subset 136 comprises non-realized regions in the local set, and solely local realized subset 138 comprises corresponding regions which are solely realized in the local set. Within remote set 84, a non-realized remote subset 140 comprises non-realized regions in the remote set, and solely remote realized subset 142 comprises corresponding regions which are solely realized in the remote set.

In the method described in the flow diagram in FIG. 4, processors 40 and 54 compute the local signatures and remote signatures solely for regions in the intersection of sets 82 and 84 (i.e., as opposed to computing the local signatures for all the local regions of set 82, and computing the remote signatures for all the remote regions of set 84). Computing the local and the remote signatures for regions in the intersection can reduce both computation and transmission times for facility 20. Further efficiencies can be gained, since memory 56 reclaims the remote regions in subset 142, as opposed to replacing non-current data in the regions of subset 142 with the corresponding current data from the non-realized regions of set 82 (i.e., copying empty data from local volume 36 to remote volume 50, since the local and the remote signatures do not match). Additionally, since the local regions of subset 138 are solely realized in the current snapshot, the local regions of subset 138 can be conveyed to remote volume 36 without the need to compute and compare their respective local and remote signatures.

The embodiments discussed hereinabove describe methods for preparing the local and remote volumes for asynchronous mirroring. Once the local and remote volumes are synchronized, an asynchronous mirroring operation can proceed. Embodiments of the present invention may also be employed to prepare remote volume 50 for synchronous mirroring. To prepare remote volume 50 for synchronous mirroring, facility 20 can perform additional synchronization steps, after completing the methods described in FIGS. 2 and 4. In the additional synchronization steps, at a time subsequent to step 64 in FIG. 2 and step 104 in FIG. 4, discussed supra), processor 40 identifies any differences between the current snapshot used during the initial synchronization, and currently active local regions 44. Local processor 40 conveys the identified differences to remote mirror initialization module 48, via channel 26, where processor 54 updates remote regions 58 with the detected differences. After these additional synchronization steps, synchronous mirroring may commence.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
    computing, in a local storage system having a local volume with a plurality of local regions, respective local signatures over the local regions;
    creating, in the local storage system, a local bitmap having local bitmap entries, each local bitmap entry indicating a local realization status for an associated local region in a current snapshot, wherein the local realization status is one of a realized status or an unrealized status;
    transferring the local bitmap to a rem system;
    locking a remote volume to a read-only mode to prevent updates to the remote volume prior to a synchronization of the local volume and the remote volume;
    computing, in the remote storage system having the remote volume with remote regions in a one-to-one correspondence with the local regions, respective remote signatures over the remote regions;
    creating, in the remote storage system, a remote bitmap having remote bitmap entries, each remote bitmap entry indicating a remote realization status for an associated remote region, wherein the remote realization status is one of a realized status or an unrealized status;
    retrieving, in the remote storage system, entries of the local bitmap and entries of the remote bitmap;
    determining from the retrieved entries of the local bitmap and the retrieved entries of the remote bitmap, in the remote storage system, whether the local realization status of a corresponding local region and the remote realization status of a corresponding remote region to the corresponding local region are both the realized status, and if so, transmitting a request to compute the respective local signatures over the corresponding local region;
    receiving, in the local storage system, parameters relating to the corresponding local region and computing the respective local signatures over the corresponding local region having the corresponding local realization status and sending the respective local signatures to a remote storage system processor;
    computing, in the remote storage system, in response to receiving the respective local signatures, the corresponding remote signatures over the corresponding remote region having the corresponding remote realization status;
    identifying for a given remote region having a given remote signature and a corresponding local region having a given local signature that the given remote signature does not match the given local signature; and
    replacing data in the given remote region with data from the corresponding local region.

2. The method according to claim 1, and comprising, at a time prior to computing the respective local signatures, creating, in the local storage system, a reference snapshot of the local volume, storing data of the reference snapshot to a removable medium, physically transferring the removable medium to the remote storage system, and loading the data of the reference snapshot from the removable medium to the remote volume.

3. The method according to claim 1, and comprising creating, by the local storage system at a time prior to computing the respective local signatures, the current snapshot, wherein the respective local signatures are computed over the local regions of the current snapshot, and at a time subsequent to creating the current snapshot, identifying, by the local storage system, differences between the current snapshot and the local regions, and conveying the identified differences to the remote volume.

4. The method according to claim 1, wherein the local signatures are computed for all the local regions of the current snapshot of the local volume, and wherein the remote signatures are computed for all the remote regions.

5. The method according to claim 1, and comprising using the remote bitmap to identify a non-realized remote region and using the local bitmap to identify a realized local region corresponding to the non-realized remote region, and replacing data in the non-realized remote region with data from realized local region.

6. The method according to claim 1, and comprising using the remote bitmap to identify a realized remote region and using the local bitmap to identify a non-realized local region corresponding to the realized remote region, and releasing the identified realized remote region.

* * * * *